US012729352B2

(12) United States Patent
Sacks

(10) Patent No.: US 12,729,352 B2
(45) Date of Patent: Sep. 8, 2026

(54) METHOD FOR PRODUCING A SHEET-FORM ACTIVE INGREDIENT CARRIER, AND ACTIVE INGREDIENT CARRIER

(71) Applicant: AVET AG, Rüti/Zürich (CH)

(72) Inventor: Roland Sacks, Cham (CH)

(73) Assignee: AVET AG, Rüti/Zürich (CH)

( * ) Notice: Subject to any disclaimer, the term of this patent is extended or adjusted under 35 U.S.C. 154(b) by 535 days.

(21) Appl. No.: 18/017,703

(22) PCT Filed: Aug. 16, 2021

(86) PCT No.: PCT/EP2021/072687

§ 371 (c)(1),
(2) Date: Jan. 24, 2023

(87) PCT Pub. No.: WO2022/038077

PCT Pub. Date: Feb. 24, 2022

(65) Prior Publication Data

US 2023/0265364 A1 Aug. 24, 2023

(30) Foreign Application Priority Data

Aug. 17, 2020 (DE) ......................... 102020121537.1
Apr. 27, 2021 (DE) ......................... 102021110796.2

(51) Int. Cl.

| | |
|---|---|
| ***C11D 17/06*** | (2006.01) |
| ***C11D 1/14*** | (2006.01) |
| ***C11D 3/22*** | (2006.01) |
| ***C11D 3/37*** | (2006.01) |
| ***C11D 3/386*** | (2006.01) |
| ***C11D 3/395*** | (2006.01) |
| ***C11D 11/00*** | (2006.01) |
| ***C11D 17/04*** | (2006.01) |

(52) U.S. Cl.

CPC ............ *C11D 17/042* (2013.01); *C11D 1/146* (2013.01)

(58) Field of Classification Search

None

See application file for complete search history.

(56) References Cited

U.S. PATENT DOCUMENTS

| | | | | |
|---|---|---|---|---|
| 6,818,606 B1* | 11/2004 | Hanada | C11D 17/06 | 510/296 |
| 2002/0013251 A1* | 1/2002 | Hayashi | C11D 3/3942 | 510/445 |
| 2004/0029763 A1* | 2/2004 | Gorlin | C11D 1/662 | 510/439 |
| 2011/0028374 A1* | 2/2011 | Fossum | C11D 3/0052 | 510/296 |
| 2011/0136719 A1* | 6/2011 | Jalbert | C11D 3/222 | 510/340 |
| 2019/0010431 A1* | 1/2019 | Cho | C11D 17/042 | |
| 2019/0093057 A1* | 3/2019 | Tan | C11D 3/3753 | |
| 2019/0233785 A1 | 8/2019 | Sivik et al. | | |
| 2021/0163698 A1* | 6/2021 | Mac Namara | C11D 17/06 | |

FOREIGN PATENT DOCUMENTS

| | | |
|---|---|---|
| DE | 102015001462 | 5/2016 |
| DE | 102015001462 B3 | 5/2016 |
| DE | 102015001510 | 8/2016 |
| EP | 0161911 | 11/1985 |
| EP | 0161911 B1 | 8/1990 |
| EP | 1978139 | 10/2008 |
| JP | 6516001 | 4/2019 |
| WO | 0145613 | 6/2001 |

OTHER PUBLICATIONS

Santex Rimar Group: Caviscat scattering system. 2021. 6 S. URL: https://www.santexrimar.com/brands/cavitec/machinery/caviscat/, archiviert in https://web.archive.org/ am 25.02.2021 [retrieved May 26, 2021].

* cited by examiner

*Primary Examiner* — Lorna M Douyon

(74) *Attorney, Agent, or Firm* — Volpe Koenig

(57) ABSTRACT

A method for producing a sheet-form active ingredient carrier containing at least one water-soluble active ingredient which is stored in manufacturer-dried state and is soluble and activatable by addition of water. According to the method, the at least one active ingredient as a scatterable or pourable powder is scattered onto an inner nonwoven composed of at least partially water-soluble material and subsequently a firm assembly is produced therefrom by fusing. The assembly produced from the inner nonwoven and from the at least one active ingredient scattered on as scatter powder is positioned as a core ply between outer nonwovens, applied on both sides, composed of at least partially water-soluble material. A sheet-form active ingredient carrier having an inner layer which carries the at least one active ingredient and which is covered on both sides by textile layers composed of at least partially water-soluble outer nonwovens is also provided.

23 Claims, No Drawings

METHOD FOR PRODUCING A SHEET-FORM ACTIVE INGREDIENT CARRIER, AND ACTIVE INGREDIENT CARRIER

CROSS-REFERENCE TO RELATED APPLICATIONS

This application is a 371 National Phase of International Application No. PCT/EP2021/072687, filed Aug. 16, 2021, which claims priority to German Patent Application No. DE 10 2020 121 537.1, filed Aug. 17, 2020, and German Patent Application No. 10 1021 110 796.2, filed Apr. 27, 2021, all of which are incorporated herein by reference as if fully set forth.

TECHNICAL FIELD

The invention relates to a method for producing a sheet-form active ingredient carrier containing at least one water-soluble active ingredient which is stored in manufacturer-dried state and is soluble and activatable by addition of water.

The invention is also concerned with a sheet-form active ingredient carrier of this kind, containing at least one water-soluble active ingredient which is stored in manufacturer-dried state and is activatable by addition of water.

BACKGROUND

Already known from the applicant's DE 10 2015 001 462 B3 is a wipe which takes the form of a multi-ply cleaning agent carrier and comprises at least two plies of material, lying directly one atop another, of which a first outer material ply forms an external wiping and cleaning ply and of which the second material ply takes the form of a reservoir ply. In order to achieve a consistent application of cleaning liquid over a specified area by means of this known wipe, the at least two material plies lying one atop another in the known wipe are produced from textile material having preferably at least approximately the same absorption or water-delivering capacity, with the wiping and cleaning ply on the one hand and the reservoir ply on the other hand being joined face-to-face with one another mechanically. In at least one of the mutually superposed material plies, there is a cleaning agent which can be reactivated by addition of water.

Already known from EP 0 161 911 A2 is a wipe which in an inner reservoir ply is impregnated with a cleaning agent which is reactivatable by addition of water, said reservoir ply being arranged on both sides between two separation plies. In this case the inner reservoir ply is impregnated with a cleaning substrate and is arranged between the two separation plies, which serve for the controlled delivery of the cleaning substrate on addition of water.

Laundering agents (detergents) for washing machines and washing agents (detergents) for machine dishwashers have to date been made available generally in powder form. Because the end user is not used to weighing out a powdery laundering or washing agent, and since it is difficult for the end user to measure off a suitable portion of the powdery laundering or washing agent in accordance with the prevailing degree of soiling of the laundry items to be cleaned, and/or with the water properties prevailing at the location of use, liquid laundering or similar cleaning agents have also already been created. These liquid laundering or similar cleaning agents, in comparison to such laundering or cleaning agents in powder form, frequently do not have a comparable cleaning power, a fact which is usually compensated by a generously measured excess of the liquid laundering, washing or similar cleaning agent.

Also already created have been what are called cleaning tabs, in which a laundering or washing agent is bound in tablet form by means of microplastic. While such cleaning tabs do make handling substantially easier, a disadvantage, however, is that any metering of the cleaning agent used in the laundering or cleaning procedure is possible at best by breaking such a cleaning tab in the middle. Conversely, more precise metering and adaptation of the portion of cleaning agent used in accordance with the degree of soiling or with the respective water properties of the water used for cleaning are not readily possible.

SUMMARY

The object, therefore, is to create a method for producing an active ingredient carrier of the abovementioned kind, said active ingredient carrier being notable for substantially simplified handling. A further object is to create an active ingredient carrier of the abovementioned kind that can be handled as simply as possible.

The achievement of this object in accordance with the invention, in the case of the method of the abovementioned kind, lies in particular in that the at least one active ingredient as scatterable or pourable powder is scattered onto an inner nonwoven composed of at least partially water-soluble material and subsequently a firm assembly is produced therefrom by fusing and in that the assembly produced from the inner nonwoven and from the at least one active ingredient applied as scatter powder is positioned as a core ply between outer nonwovens, applied on both sides, composed of at least partially water-soluble material.

In the method of the invention, at least one, preferably water-soluble, active ingredient is scattered as scatterable or pourable powder onto an inner nonwoven, said inner nonwoven being produced at least partially from water-soluble material. Subsequently, from the inner nonwoven and from the active ingredient applied thereon as scatter powder, a firm assembly is produced by fusing. This fusing process is eco-friendly, since no removal of water is needed and nor are any wastewaters produced. Emissions to the air are also very largely reduced. The method of the invention is also notable for its economy. The assembly produced from the inner nonwoven and from the at least one active ingredient applied as scatter powder is positioned, in a subsequent method step, as a core ply between outer nonwovens, applied on both sides, which are likewise produced from an at least partially water-soluble material. As a result of the outer nonwovens forming the outside of the active ingredient carrier, the active ingredient is accommodated in protected form in the interior of the active ingredient carrier, and it is consequently possible, for example, to avoid unnecessary contact of the user with the active ingredient when handling or portioning the active ingredient carrier. The active ingredient carrier produced in the method of the invention is therefore notable for its simplicity of handling.

In order to be able to distribute the at least one active ingredient evenly in the desired active ingredient amount over the inner nonwoven, it is advantageous if before being scattered onto the inner nonwoven, the at least one active ingredient is processed by a grinding and homogenizing process to give the scatterable and pourable powder.

The economy of the method of the invention is also additionally promoted if the inner nonwoven and the at least one active ingredient scattered on as powder are fused to give a firm assembly at a temperature in the range between 140° to 220°.

The consistency and the practicability of the active ingredient carrier produced in the method of the invention are further improved if the inner nonwoven and the at least one active ingredient scattered on as powder are fused and compressed by a calender process to give a firm assembly.

In the active ingredient carrier of the abovementioned kind, the solution of the invention to the object stated above is in particular that the plate-form active ingredient carrier has an inner layer which carries the at least one active ingredient and which is covered on both sides by textile layers composed of at least partially water-soluble outer nonwovens.

Because the inner layer carrying the at least one active ingredient is covered on both sides by textile layers composed of at least partially water-soluble outer nonwovens, the active ingredient is accommodated in protected form in the interior of the sheet- or bar-form active ingredient carrier. Since accordingly there can be no direct contact between the skin of the user and the at least one active ingredient located in the inner layer, it is also possible in the active ingredient carrier of the invention to make use, for example, of skin-irritating active ingredients or those which are classed as hazardous to operate with, in such a way that their usage is substantially simplified.

In one preferred development according to the invention, for the sheet-form active ingredient carrier, it is the case that the inner layer carrying the at least one active ingredient has an inner nonwoven composed of at least partially water-soluble material, which inner nonwoven is joined to the at least one active ingredient, scattered on as scatterable and pourable powder, by fusing and/or is compressed by a calender process. The active ingredient carrier of the invention is therefore produced in an embedded fusing process, where an inner nonwoven carrying the at least one active ingredient is covered on both sides by outer textile nonwovens.

It may be advantageous if the at least one active ingredient is a laundering, washing, cleaning or comestible agent. Where the active ingredient carrier of the invention comprises a laundering agent, this sheet-form laundering agent carrier may be used for example in a washing machine as detergent in a simple way and may be portioned according to requirement. If, conversely, the active ingredient takes the form of a washing agent, the active ingredient carrier of the invention may be used as an alternative to liquid or granular dishwashing detergents in a machine dishwasher. Where, instead, the active ingredient carrier of the invention comprises at least one cleaning agent as active ingredient, the active ingredient carrier of the invention may also be used advantageously as a cosmetic cleansing wipe. Because the active ingredient carrier usable as a cosmetic cleansing wipe can be stored and transported in a dry state and since it is easy to activate the active ingredients located in the active ingredient carrier of the invention, by mere addition of water, the handling and the transport of the active ingredient carrier of the invention are made substantially simpler. For example, a cleansing wipe in the form of a dry active ingredient carrier can also be easily carried in the case of journeys by air, without such a cleansing wipe being subject to the restrictions on air journeys that apply in respect of liquid cosmetics.

In one preferred embodiment according to the invention, therefore, the cleaning agent may also be a cleansing personal care agent.

It is, however, also possible for the comestible agent contained as active ingredient in the active ingredient carrier of the invention to be a user-stimulating comestible agent, such as tea, for example.

In a further advantageous usage example according to the invention, the active ingredient carrier of the invention takes the form of a compress. In this case the active ingredient carrier in compress form may also contain at least one active ingredient which through water uptake initiates exothermic processes.

In an embodiment according to the invention that is simple to produce, the inner nonwoven is produced from a polyvinyl alcohol.

It may be advantageous if the active ingredient in the form of a cleaning agent comprises at least one melting surfactant and at least one melting polymer.

In this case, in one preferred embodiment according to the invention, the active ingredient comprising at least one melting surfactant and at least one melting polymer is admixed with at least one temperature-stable, non-melting bleaching agent and/or complexing agent and/or enzyme as additive.

It is advantageous if in the at least one active ingredient, the at least one surfactant has a fraction of 10 to 60 percent by weight (dry) and if the melting polymer has a fraction of 20 to 40 percent by weight (dry).

In order to use the laundry agent carrier of the invention as an effective cleaning agent, it may be advantageous if the active ingredient comprises sodium lauryl sulfate as melting surfactant. In that case the surfactant in the form of sodium lauryl sulfate may have a melting point of about 206° C.

It is useful if the melting polymer used comprises for example a polyvinyl alcohol, more particularly having a melting point of around 200°.

Additionally, or instead of the above-described exemplary embodiments, in the case of the sheet-form active ingredient carrier of the invention, in order to achieve the object described above, it may also be the case that the active ingredient carrier is portionable by breaking off and/or separating individual subregions of the active ingredient carrier. In this sheet-form active ingredient carrier, for example, at least one laundering, washing, cleaning or comestible agent in manufacturer-dried state is stored in an areally distributed manner. Through addition of water, the active ingredient stored in the active ingredient carrier can be dissolved and activated for example for a cleaning procedure. In order to be able to adapt the cleaning agent, distributed areally in manufacturer-dried state on the active ingredient carrier, to the degree of soiling of the at least one article to be cleaned and/or to the water hardness or similar property of the water used for cleaning, for example, and in order to be able to avoid environmental pollution caused by excessive doses of cleaning agent, or residual soiling owing to inadequate addition of the cleaning agent, the active ingredient carrier of the invention is foldable and/or separable in form and is portionable by breaking off and/or separating individual subregions of the active ingredient carrier. If the active ingredient carrier is foldable, for example, the active ingredient carrier can be torn into individual subregions along the fold line or else—by means, for example, of a knife or scissors—can be divided easily and precisely, without substantial portions of the active ingredient serving as cleaning agent falling off from the active ingredient carrier in the form of fine particles. If the active ingredient carrier is not foldable, separation of the active ingredient carrier of the invention into individual portioning subregions can be facilitated in other ways. As a result of the sheet- or bar-form configuration of the active ingredient carrier, it can be divided into individual subregions and portioned, and a subregion of the active ingredient carrier that is adapted to the degree of soiling and/or the water properties of the water used for cleaning, for example, and hence a portion of the active ingredient stored in this subregion of the active ingredient carrier, can be respectively separated off and portioned.

In the interest of particularly effective metering, it is advantageous here if the active ingredient carrier can be divided into at least three subregions that can be separated off from one another.

The simple and easy metering of the active ingredient located on the active ingredient carrier of the invention and distributed areally there preferably in a core ply is also made substantially easier for the untrained user if the active ingredient carrier can be divided into mutually separable subregions by means of at least one linear weakening point. In that case the sheet-form active ingredient carrier may also have at least two sets of intersecting linear weakening points which intersect one another at an angle and preferably at right angles. As a result of these intersecting linear weakening points, the active ingredient carrier of the invention can be separated in longitudinal direction and/or in transverse direction into individual, preferably rectangular, subregions.

In particularly simple and easy-to-produce embodiments according to the invention, the at least one weakening point takes the form of a perforation or narrowed cross section of the active ingredient carrier of the invention.

The active ingredient carrier of the invention may be produced from a textile material. Preference in that case is given to a version wherein the active ingredient carrier of the invention is produced from at least three plies of nonwoven, with an inner nonwoven, carrying the at least one active ingredient, forming the core ply, and with the inner nonwoven serving as core ply being covered on both sides by at least one outer nonwoven.

The nonwoven plies of the active ingredient carrier of the invention are produced from an at least partially water-soluble material. If water-insoluble materials are also used in individual nonwoven plies of the active ingredient carrier of the invention, it is advantageous if the water-insoluble material used in the active ingredient carrier of the invention is produced from a recyclable and, in particular, a reusable material.

It may be advantageous if at least one of the nonwoven plies of the active ingredient carrier of the invention is produced from a fibrous material and/or from cellulose. In that case the acceptance and handling of the active ingredient carrier of the invention is substantially promoted if at least the outer nonwovens produced from cellulosic material have a paper-like tactility.

In the cases of complex cleaning procedures which provide for the use of different cleaning agents to be supplied at different points in time during the cleaning procedure, it is advantageous if the active ingredient carrier, and more particularly the inner nonwoven thereof, bears at least two layers of active ingredient, applied by scattering or the like, and if the active ingredient layers are dissoluble in the added water within different exposure times and/or at different temperatures.

It is also possible for the active ingredient layers applied to the inner nonwoven by scattering or the like to be separated from one another at least by an interposed water-soluble separation layer, and for the separation layer to be dissoluble with addition of water within a defined exposure time and/or at a defined temperature, and to release the underlying active ingredient layer.

Additionally or instead it is also possible for an external active ingredient layer applied to the inner nonwoven to be enveloped by a separation layer which is dissoluble within a defined exposure time and/or at a defined temperature of the added water, and releases the external active ingredient layer. Since the active ingredient, active for example as a laundering, washing or similar cleaning agent, is stored in manufacturer-dried state in the active ingredient carrier and the inner nonwoven thereof, the storage of moist active ingredient carriers and the use of a correspondingly moisture tight packaging are avoided. Since the active ingredient carrier provided with the active ingredient and stocked with this active ingredient in dried state does not have to be stored in moisture tight packaging, any mold infestation of the active ingredient carriers otherwise still wetted with liquid active ingredients is avoided.

Because the active ingredient carrier of the invention may also comprise a plurality of layers or plies of different active ingredients on its inner nonwoven, it is possible for the various active ingredients located on the active ingredient carrier to be dissolved at different, mutually successive time intervals during the usage process. For example, a cleaning agent to be provided from the start may form the outer ply of the active ingredient layers applied to the inner nonwoven, with these outer plies of the inner nonwoven being separated from at least one underlying active ingredient layer or cleaning agent layer, which is not needed until later in the cleaning process, by an interposed defined separation layer, which is dissolved and released only at a later point in time, depending on the exposure time and/or the temperature. In this way, two or more active ingredients may also be scattered or applied on the sheet-form active ingredient carrier of the invention.

In one exemplary embodiment, the sheet-form active ingredient carrier of the invention comprises an at least partially water-soluble inner nonwoven which is produced, for example, from a polyvinyl alcohol or from another suitable material. Applied to this inner nonwoven is an active ingredient serving for example as a cleaning or washing agent, in the form of a pulverulent scatter coating. This active ingredient may be produced in a grinding and homogenizing process to give a scatterable and pourable powder which is applied to the inner nonwoven by scattering using a scatter powder system, as for example https://www.santexrimar.com/brandes/cavitec/machinery/caviscat/, before the inner nonwoven and the active ingredient scattered thereon are fused to give a firm assembly and compressed by a calender process at temperatures of about 140° to 220°. The active ingredient applied to the inner nonwoven may have a fraction of 10 to 60 percent by weight of melting surfactants, such as of sodium lauryl sulfate with 206° melting point, for example, and 20 to 40 percent by weight of melting polymers, such as of polyvinyl alcohol with a melting point of 200° C., for example. Furthermore, the active ingredient may also contain admixtures of bleaching agents, complexing agents, enzymes or other temperature-stable, non-melting additives.

In a subsequent method step, the inner nonwoven serving as core ply and firmly assembled with the at least one active ingredient is provided on each of the two opposite flat sides of the sheet-form active ingredient carrier with an outer nonwoven, these outer nonwovens likewise consisting of an at least partially water-soluble material. These outer nonwovens are laminated onto both sides of the top faces of the initially web-form inner nonwoven, so that the formulation fused onto the inner nonwoven is positioned in the core between the two outer nonwovens. The assembly produced in this way and composed of the core ply comprising, for example, a laundering or cleaning agent is covered on both sides by water-soluble outer nonwovens. Since the chemicals of a laundering or cleaning agent are frequently irritant to the skin and are classed as hazardous in operation, therefore, direct skin contact is ruled out in an advantageous way. The fusing process needed for the production of the assembly consisting of inner nonwoven and active ingredient is eco-friendly, since there is no removal of water needed and nor are any waste waters produced. Emissions to the air are also very largely reduced. A laundering agent of this kind can be produced economically in the method of the invention. In a downstream process step, fragrances may be applied by spraying onto the active ingredient carrier. Such fragrances may alternatively be used in the pulverulent preliminary formulation of the active ingredient.

If the materials used for producing the inner nonwoven and/or the outer nonwovens also contain water-insoluble constituents, it is advantageous if these water-insoluble constituents of the nonwovens are biodegradable.

The invention claimed is:

1. A sheet-form active ingredient carrier, comprising:

at least one water-soluble active ingredient which is stored in manufacturer-dried state, is soluble and activatable by addition of water, and is a scatterable or pourable powder;

an inner layer which carries the at least one active ingredient, wherein the inner layer comprises an inner nonwoven composed of at least partially water-soluble material, and wherein the inner layer and the at least one active ingredient are fused to form a solid composite; and textile layers composed of at least partially water-soluble outer nonwovens on both sides of the inner layer.

2. The sheet-form active ingredient carrier as claimed in claim 1, wherein the at least one active ingredient is a laundering, washing, cleaning or comestible agent.

3. The sheet-form active ingredient carrier as claimed in claim 1, wherein the at least one active ingredient is a cleansing personal care agent.

4. The sheet-form active ingredient carrier as claimed in claim 1, wherein the at least one active ingredient comprises a user-stimulating comestible agent.

5. The sheet-form active ingredient carrier as claimed in claim 1, wherein the sheet-form active ingredient carrier is a compress that contains the at least one active ingredient, which through water uptake initiates exothermic processes.

6. The sheet-form active ingredient carrier as claimed in claim 1, wherein the inner layer comprises a nonwoven material formed of a polyvinyl alcohol.

7. The sheet-form active ingredient carrier as claimed in claim 1, wherein the at least one active ingredient comprises a cleaning agent including at least one melting surfactant and at least one melting polymer.

8. The sheet-form active ingredient carrier as claimed in claim 7, wherein the cleaning agent comprising the at least one melting surfactant and the at least one melting polymer is admixed with at least one of (a) a temperature-stable, non-melting bleaching agent, (b) a complexing agent, or (c) an enzyme.

9. The sheet-form active ingredient carrier as claimed in claim 7, wherein the at least one melting surfactant has a fraction of 10 to 60 percent by weight and the at least one melting polymer has a fraction of 20 to 40 percent by weight.

10. The sheet-form active ingredient carrier as claimed in claim 7, wherein the at least one melting surfactant comprises sodium lauryl sulfate, and the sodium lauryl sulfate has a melting point of about 206° C.

11. The sheet-form active ingredient carrier as claimed in claim 7, wherein the melting polymer comprises a polyvinyl alcohol having a melting point of around 200° C.

12. The sheet-form active ingredient carrier as claimed in claim 1, wherein the at least one active ingredient is ground and homogenized to form the scatterable or pourable powder.

13. The sheet-form active ingredient carrier as claimed in claim 3, wherein the inner nonwoven and the at least one active ingredient scattered on as the powder are fused together at a temperature in a range between 140° C. to 220° C.

14. The sheet-form active ingredient carrier as claimed in claim 1, wherein the active ingredient carrier is portionable by at least one of breaking off or separating individual subregions of the active ingredient carrier.

15. The sheet-form active ingredient carrier as claimed in claim 1, wherein the active ingredient carrier is formed from at least one of a water-soluble or biocompatible material.

16. The sheet-form active ingredient carrier as claimed in claim 15, wherein the sheet-form active ingredient carrier comprises cellulosic material.

17. The sheet-form active ingredient carrier as claimed in claim 1, further comprising at least two sprayed-on layers of laundering, washing or cleaning agents, and the at least two sprayed-on layers are dissoluble in added water within at least one of different exposure times or by different exposure temperatures.

18. The sheet-form active ingredient carrier as claimed in claim 17, wherein the at least two sprayed-on layers are separated from one another at least by an interposed water-soluble separating layer, and the separating layer is dissoluble at least one of within a defined exposure time or at a defined exposure temperature and releases the underlying cleaning agent layer.

19. The cleaning agent carrier as claimed in claim 1, further comprising at least one cleaning agent layer enveloped by a separating layer which is dissoluble with addition of water at least one of within a defined exposure time or at a defined exposure temperature in order to release the cleaning agent layer.

20. A method for producing the sheet-form active ingredient carrier as claimed in claim 1, containing the at least one water-soluble active ingredient which is stored in a manufacturer-dried state and is soluble and activatable by addition of water, the method comprising:

scattering the at least one active ingredient onto the inner nonwoven composed of at least partially water-soluble material to form the inner layer;

subsequently producing the solid composite therefrom by fusing; and positioning the solid composite produced from the inner nonwoven and from the at least one active ingredient applied as the powder as a core ply between the at least partially water-soluble outer nonwovens applied on both sides of the solid composite.

21. The method as claimed in claim 20, further comprising before being scattered onto the inner nonwoven, grinding and homogenizing the at least one active ingredient to form the scatterable or pourable powder.

22. The method as claimed in claim 20, further comprising fusing the inner nonwoven and the at least one active ingredient scattered on as the powder to form the solid composite at a temperature in a range between 140° C. to 220° C.

23. The method as claimed in claim 20, further comprising fusing and calendering the inner nonwoven and the at least one active ingredient scattered on as the powder to form the solid composite.

* * * * *